United States Patent [19]

King

[11] 3,941,748

[45] Mar. 2, 1976

[54] PROCESS FOR PREPARING AROMATIC POLYMERS IN PRESENCE OF ALKALI METAL FLUORIDE

[75] Inventor: Terence King, New Barnet, England

[73] Assignee: Imperial Chemical Industries Limited, London, England

[22] Filed: Sept. 17, 1974

[21] Appl. No.: 506,846

Related U.S. Application Data

[63] Continuation of Ser. No. 392,010, Aug. 27, 1973, abandoned, and a continuation of Ser. No. 169,858, Aug. 6, 1971, abandoned.

[30] Foreign Application Priority Data

Aug. 19, 1970 United Kingdom............... 29931/70
May 19, 1971 United Kingdom............. 15579/71

[52] U.S. Cl................ 260/47 R; 260/49; 260/63 K; 260/63 HA; 260/79; 260/79.3 M; 260/823
[51] Int. Cl.² C08G 65/38; C08G 65/40; C08G 75/20
[58] Field of Search........... 260/47 R, 49, 79, 79 M, 260/63 K, 63 HA, 823

[56] References Cited
UNITED STATES PATENTS 3,634,355  1/1972  Barr et al............................. 260/49

FOREIGN PATENTS OR APPLICATIONS 1,078,234  8/1967  United Kingdom
1,177,183  1/1970  United Kingdom

OTHER PUBLICATIONS

Ingold, Structure and Mechanism in Organic Chemistry, Cornell Univ. Press, Ithica, N.Y., 1953 (p. 71).
Hine, Physical Organic Chemistry, 2d ed., McGraw-Hill, N.Y. 1962 (pp. 85–87).
Lavrischev et al, (Russian) J. Gen. Chem. 30, 3037–3044(1960).
Vorozhtsov et al, (Russian) J. Gen. Chem. 28, 40–44(1958).

*Primary Examiner*—Lester L. Lee
*Attorney, Agent, or Firm*—Cushman, Darby & Cushman

[57] ABSTRACT

An aromatic polymer comprising recurring units having the formula —Ar—Q— is made by a new process which comprises heating an alkali metal fluoride with an activated halophenol of the formula X—Ar—QH and/or a substantially equimolar mixture of an activated dihalobenzenoid compound of the formula X—Ar—X and a dihydric phenol of the formula HQ—Ar—QH in which formulae Ar and Q are respectively a bivalent aromatic residue and an oxygen or sulphur atom and may vary from unit to unit in the polymer chain and X is a halogen atom, the amount of alkali metal fluoride being such that together with any of the X atoms that are fluorine the total number of fluorine atoms in the reaction system is at least twice the number of —QH groups in the system.

14 Claims, No Drawings

PROCESS FOR PREPARING AROMATIC POLYMERS IN PRESENCE OF ALKALI METAL FLUORIDE

This application is a continuation of Application Ser. No. 392,010, filed Aug. 27, 1973, and now abandoned, which is relied upon and incorporated by reference herein; said United States Application Ser. No. 392,010 being a continuation of Ser. No. 169,858, filed Aug. 6, 1971, and now abandoned, which Application Ser. No. 169,858 is also relied upon and incorporated herein by reference.

This invention relates to the manufacture of aromatic polymers containing aromatically bound oxygen and/or sulphur atoms in the polymer chain.

According to the invention, an aromatic polymer comprising recurring units having the formula —Ar-Q— is made by a new process which comprises heating an alkali metal fluoride with an activated halophenol of the formula X-Ar-QH and/or a substantially equimolar mixture of an activated dihalobenzenoid compound of the formula X-Ar-X and a dihydric phenol of the formula HQ-Ar-QH, in which formulae Ar and Q are respectively a bivalent aromatic residue and an oxygen or sulphur atom and may vary from unit to unit in the polymer chain and X is a halogen atom, the amount of alkali metal fluoride being such that together with any of the X atoms that are fluorine the total number of fluorine atoms in the reaction system is at least twice the number of —QH groups in the system.

The alkali metal fluoride required for the reaction may be formed partially or wholly in situ by the selfcondensation of an alkali metal salt of an activated fluorophenol of the formula F-Ar-QM or by the condensation of a substantially equimolar mixture of an activated difluorobenzenoid compound of the formula F-Ar-F and an alkali metal salt of a dihydric phenol of the formula MQ-Ar-QM, M being alkali metal and Ar and Q as previously defined.

Any halophenol (or halothiophenol) is suitable for the invention provided that the halogen atom is linked to an aromatic ring which has an activating electronattracting group ortho or para to the halogen atom. The halophenol can have the halogen atom and hydroxy or thiol group linked to the same benzenoid ring or to different benzenoid rings provided that the benzenoid ring to which the halogen atom is linked is activated by an electronattracting group. Hence halophenols having the formula I, II or III may be used

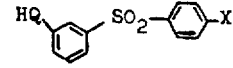  I

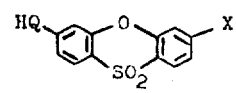  II

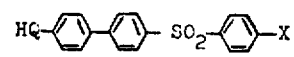  III

Any dihalobenzenoid compound can be employed in this invention provided that each of the two halogen atoms is bonded to an aromatic ring which has an activating electron-attracting group ortho or para to the halogen atom. The dihalobenzenoid compound can be either mononuclear (where the halogen atoms are attached to the same benzenoid ring) or polynuclear (where they are attached to different benzenoid rings), provided that there is an activating electron-attracting group in the ortho or para position to the halogen atoms.

Any electron-attracting group inert under the conditions of the reaction can be used as the activating group in these compounds. The more powerful electronattracting groups give the highest reaction rates and are therefore preferred. Electron-donating groups should be absent from the same benzenoid ring as the halogen atom. The electron-attracting group may be a univalent group that can activate one or more halogen atoms on the same ring, such as for example a nitro, phenylsulphonyl, alkylsulphonyl, cyano, trifluoromethyl or nitroso group or a hetero-aromatic nitrogen as in pyridine; the electronattracting group may be a bivalent group which can activate displacement of halogen atoms on two different rings, e.g., —SO$_2$—; —CO—; —SO—; —CH=CH—; —N=N—; —CH$_2$—CF$_2$—; —PR(O)— (where R is a hydrocarbon group); or —C(=CX$_2$)— (where X can be hydrogen or halogen); or the electron-attracting group may be a bivalent group which can activate halogens on the same ring such as in difluorobenzoquinone, 1,4- or 1,5- or 1,8-difluoroanthraquinone, or tetrachlorobenzoquinone.

In particular, the halophenol or dihalobenzenoid compound may have the formula

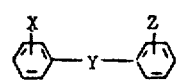

in which X is a halogen atom, Z is respectively a hydroxy or thiol group or a halogen atom and Y is —SO$_2$—, —SO—, —CO— or a radical of the formula

—Y'-A-Y"— in which Y' and Y" may be the same or different and each is —SO$_2$—, —SO— or —CO— and A is a bivalent organic radical, which may be aliphatic, aromatic or heterocyclic and has both valencies linked to carbon atoms. For example, A may be a bivalent aromatic radical derived from benzene, a fused-ring aromatic hydrocarbon containing not more than two aromatic rings (for example naphthalene, indene, fluorene or dibenzofuran) or a compound of the formula

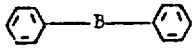

in which B is a direct link, —O—, —S—, SO₂—, —CO—, a further radical of the formula

as defined above, a bivalent hydrocarbon or substituted hydrocarbon radical (e.g. alkylene, alkylidene or a bivalent cycloaliphatic or aromatic radical), or a residue of an organic diol or dithiol (i.e. the bivalent radical obtained by removing the hydrogen atoms from the two hydroxy or thiol groups). The halogen atom is preferably in the para position to the bridging group Y.

Any dihydric phenol (or thiophenol) can be used for the invention. The phenol can be mononuclear (where the hydroxy or thiol groups are attached to the same benzenoid ring) or polynuclear (where they are attached to different benzenoid rings). The phenols may be substituted with inert substituents for example alkyl and alkoxy groups. For example the dihydric phenol may have the formula

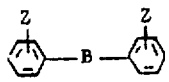

in which Z is a hydroxy or thiol group and B is hereinbefore defined. Preferred dihydric phenols include the following four types and the derivatives thereof which are substituted with inert substituent groups:

(a) 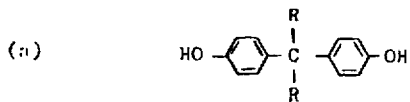

in which each R group represents hydrogen, lower alkyl, or lower aryl and the R groups can be the same or different, (b) 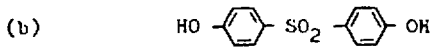

(c) 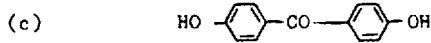

(d) 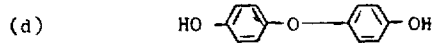

Lower alkyl, alkoxy or alkylthio groups may be present as substituents on any of the aromatic rings but are preferably absent from the halogen-bearing rings and are also preferably absent altogether when the aromatic copolymer is required to be stable at high temperatures. Additional halogen atoms may also be present in unactivated positions meta to activating groups.

If desired, the polymers can be prepared using mixtures of two or more materials selected from halophenols, halothiophenols, dihydric phenol/dihalobenzenoid compound combinations, and dihydric thiophenol/dihalobenzenoid compound combinations, and the halocompounds may contain different electron-attracting groups.

The halogen atoms in the halocompounds are preferably chlorine or fluorine. The fluorine derivatives generally are more reactive and when they are used the amount of alkali metal fluoride can be reduced correspondingly, but they are more expensive. Bromine derivatives are also relatively expensive and although they resemble the chlorine derivatives in performance they would seem to offer no advantages. Iodine derivatives are generally less suitable.

The process of the invention is carried out in the presence of an alkali metal fluoride in an amount such that the total number of fluorine atoms in the system is at least twice the number of hydroxy and/or thiol groups. The molar concentration of alkali metal fluoride present is at least equal to the sum of the molar concentration of hydroxy (or thiol) groups and halogen atoms other than fluorine present. When the halogen atoms of the dihalobenzenoid compound are chlorine, bromine, and/or iodine, there is preferably a four-fold molar excess of alkali metal fluoride; when the halogen atoms are both fluorine, then there is preferably a two-fold molar excess. When the halogen atom of the halophenol is chlorine, bromine or iodine there is preferably a two-fold molar excess of alkali metal fluoride; when the halogen atom is fluorine, then the alkali metal fluoride is preferably present in equivalent molar amount. A greater quantity of alkali metal fluoride than that preferred can be used without detriment to the reaction but serves no useful purpose and adds to the overall cost. The alkali metal is conveniently sodium or potassium. Reaction occurs more readily if the potassium cation is present and potassium fluoride is therefore preferred.

The process of the invention may also be used for the preparation of aromatic sulphone copolymers by carrying out the reaction in the presence of a polyaryl sulphone containing repeat units —Ar'-SO₂— where Ar' is a bivalent aromatic residue which may vary from unit to unit in the polymer chain and at least some of the Ar' units have an aromatic ether or thioether group in the polymer chain ortho or para to at least one —SO₂— group.

Aromatic polysulphones containing aromatic ether or thioether groups in the polymer chain ortho or para to at least one —SO₂— group, and methods for making them, are described in British specifications Nos. 1,016,245; 1,060,546; 1,078,234; 1,109,842; 1,122,192; 1,133,561; 1,153,035; 1,153,528 and 1,177,183; United States specification No. 3,432,468, Netherlands specification No. 69 03070 and German specification No. 1,938,806, the disclosure of which are incorporated herein by reference.

The aromatic polysulphones described in the above-mentioned specifications comprise repeating units of the formula

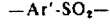

in which Ar' is a bivalent aromatic radical and may vary from unit to unit in the polymer chain (so as to form copolymers of various kinds). Thermoplastic polysulphones generally have at least some units of the structure

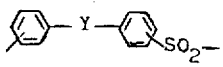

in which Y is oxygen or sulphur or the residue of an aromatic diol such as a 4,4'-bisphenol. One example of such a polysulphone has repeating units of the formula

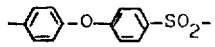

another has repeating units of the formula

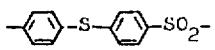

and others (which are commercially available in the United States of America) are said to have repeating units of the formula

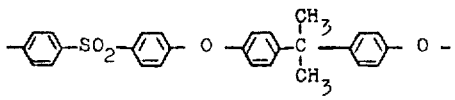

(Union Carbide Corporation) or copolymerised units in various proportions of the formulae

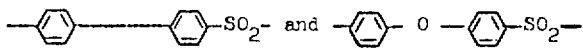

(Minnesota Mining and Manufacturing Company).

The polymerisation reaction may be carried out in the presence of a dipolar aprotic liquid under essentially anhydrous conditions, and especially when the polymerisation reagent is an activated halophenol (or halothiophenol) the reaction may also be carried out in the melt. Suitable liquids for the reaction include the lower dialkyl and cyclic alkylene sulphoxides and sulphones (e.g. dimethyl sulphoxide and 1,1-dioxothiolan), aromatic nitriles (e.g. benzonitrile) and diaryl ketones (e.g. benzophenone), sulphoxides and sulphones. Mixtures of such substances may conveniently be used, e.g. when one or more components of the mixture would otherwise be solid at the reaction temperature. The liquid (or mixture of liquids) should be a solvent for the halophenol or the halothiophenol or the dihalobenzenoid compound and the dihydric phenol or thiophenol, and preferably it should also be a solvent for the aromatic polymer. The amount of the liquid is relatively unimportant provided it is sufficient to dissolve the organic reactants and is not too large to be economically disadvantageous. The total amount of solvent used is desirably sufficient to ensure that none of the organic starting materials is in the solid state in the reaction mixture. The liquid initially present in the reaction medium need not be the same as that present during the final formation of the polymer. The original liquid may be allowed to remain during the reaction, with the subsequent addition of any desired solvents, or it may be removed, e.g. by distillation.

The rate of polymer formation in the reaction of the invention rises with rise of temperature and below 200°C may be slow. It may however be advantageous to preheat the reaction mixture between 100°C and 200°C and then raise the temperature to produce the polymer. Temperatures up to 400°C may be employed, and 200°–250°C is usually convenient.

The reaction may be carried out under pressure if necessary to prevent the escape of any volatile reagent or solvent. heating in vacuum may however be desirable at a later stage to remove unwanted solvents, e.g. dimethyl sulphoxide which decomposes at the temperatures required to produce high polymer.

The vessel used should be made of or lined with a material that is inert to alkali and also to alkali metal halides under the conditions employed. For example, glass is unsuitable as it tends to react with alkali metal fluoride at high temperatures, contaminating the product with silicate and possibly upsetting the stoichiometry of the polymerisation. Some grades of stainless steel undergo surface crazing at these temperatures in the presence of alkali metal halide, and vessels made of or lined with titanium or nickel or an alloy thereof or some similarly inert material are preferable.

The polymerisation must be conducted under substantially anhydrous conditions to obtain products of high molecular weight.

When the polymer is formed in solution, a convenient procedure is to add the reaction mixture (which may be decanted or filtered from solid alkali metal halide), to an excess of a liquid which is miscible with the reaction solvent but in which the polymer is insoluble. If the reaction solvent is water-miscible, or is miscible with a liquid in which residual alkali metal halide also dissolves, the polymer can thus be obtained in one step. Otherwise, as for example if the reaction mixture is poured into methanol, the precipitated polymer initially contains alkali metal halide which can subsequently be washed out with water.

The following examples illustrate the invention.

EXAMPLE 1

4-(4-Fluorophenylsulphonyl)phenol (25.2 g; 0.10 mole), anhydrous potassium fluoride (5.8 g; 0.10 mole) and dimethyl sulphone (13.0 g) were placed in a 3-necked round-bottomed flask fitted with a stirrer, air condenser, and an inlet for dry nitrogen. The reagents were heated with stirring at 220°C under a stream of dry nitrogen. After 20 hours, the viscous reaction mixture was cooled to 140°C and dimethyl formamide added to dissolve the polymer. The solution of the polymer in dimethyl formamide was filtered to remove insoluble inorganic salts and the clear filtrate poured into ethanol in a macerator. A white polymer was precipitated, filtered off and boiled with water for one hour. The mixture was filtered whilst still hot and the polymer again treated with hot water. The polymer was filtered off and dried at 140°C under vacuum to give 21 g (91% yield) of polymer having repeat units of the structure

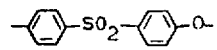

and a reduced viscosity of 0.52 as measured at 25°C on a solution in dimethyl formamide containing 1 g of polymer in 100 cm³ of solution (i.e. 1% w/v).

EXAMPLE 2

Bis-(4-chlorophenyl) sulphone (14.35 g; 0.05 moles), bis-(4-hydroxyphenyl) sulphone (12.50 g; 0.05 moles), anhydrous potassium fluoride (12.0 g; 0.21 moles) and sulpholane (1,1-dioxothiolan) (58 g) were reacted at 220°C for 140 hours and the polymer isolated according to the method of Example 1. The resulting polymer (20 g; 86% yield) had repeat units of the structure

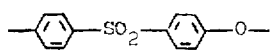

and it had a reduced viscosity of 0.40 as a 1% w/v solution in dimethyl formamide at 25°C.

EXAMPLE 3

The anhydrous potassium salt of 4-(4-fluorophenylsulphonyl)phenol (5.0 g; 0.0172 moles) and 4-(4-fluorophenylsulphonyl)phenol (4.3 g; 0.0172 moles) and 1,1-dioxothiolan (21 g) were reacted at 200°C for 30 hours and the polymer isolated according to the method of Example 1. The polymer (7 g; 87% yield) had a reduced viscosity of 0.42 as a 1% w/v solution in dimethyl formamide at 25°C.

EXAMPLE 4

2,2-Bis(4-hydroxyphenyl)propane (11.42 g; 0.05 mole), bis-(4-fluorophenyl) sulphone (12.71 g; 0.05 mole), anhydrous potassium fluoride (5.8 g; 0.10 mole) and 1,1-dioxothiolan (36 g) were reacted together at 220°C for 72 hours and the polymer isolated according to the method of Example 1. The polymer had repeat units of the formula

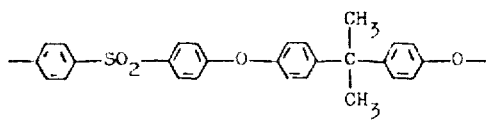

and had a reduced viscosity of 0.62 as a 1% w/v solution in dimethyl formamide at 25°C.

EXAMPLE 5

A sample of 4,4'-bis(4-chlorophenyl sulphonyl) biphenyl (25.15 g; 0.05 mole), bis-(4-hydroxyphenyl) sulphone (12.50 g; 0.05 mole), anhydrous potassium fluoride (12 g; 0.21 mole) and 1,1-dioxothiolan (43.1 g) were reacted together at 240°C for 43 hours and the polymer isolated according to the method of Example 1. The polymer had repeat units of the formula

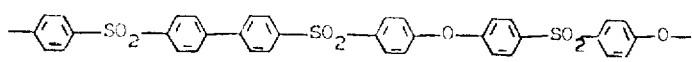

and had a reduced viscosity of 0.55 as a 1% w/v solution in dimethyl formamide at 25°C.

A sample of the polymer was pressed at 350°C to give a clear tough film.

EXAMPLE 6

Bis-(3,4-dichlorophenyl)sulphone (17.81 g; 0.05 mole), bis-(4-hydroxyphenyl)sulphone (12.51 g; 0.05 mole), anhydrous potassium fluoride (12.00 g; 0.21 mole) and 1,1-dioxothiolan (29.2 g) were reacted together in a glass flask under a stream of nitrogen for 23 hours at 240°C. The reaction mixture was cooled to 150°C, diluted with 1,1-dioxothiolan (73 g) and methyl chloride gas was bubbled through the reaction mixture at 150°C for 1 hour. The polymer was precipitated with methanol, filtered, washed with dilute acetic acid and extracted with boiling water. Polymer (19.0 g) was recovered as a white powder and the infra-red spectrum of the polymer was consistent with the structure

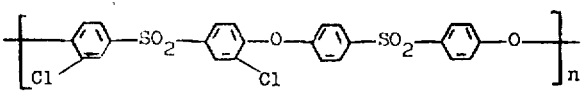

The polymer was found to have a reduced viscosity of 0.34 as a 1% w/v solution in dimethyl formamide at 25°C.

EXAMPLE 7

4,4'-bis(4-hydroxyphenylsulphonyl)biphenyl (2.91 g; 0.00625 mole), bis[4'-(4-chlorophenylsulphonyl)-biphenyl] sulphone (4.49 g; 0.00625 mole), anhydrous potassium fluoride (1.45 g; 0.025 mole) and 1,1-dioxothiolan (8.0 g) were heated under nitrogen atmosphere for 4 hours at 280°C. The reaction mixture was cooled to 160°C and a further quantity of 1,1-dioxothiolan (10 g) was added. The reaction product was dissolved in dimethylformamide and the solution poured into a large volume of methanol to yield a white precipitate. The solid material was filtered, extracted successively with water and methanol and then dried. The polymer has a reduced viscosity of 0.40 as a 1% w/v solution in dimethyl formamide at 25°C and was found to have repeat units

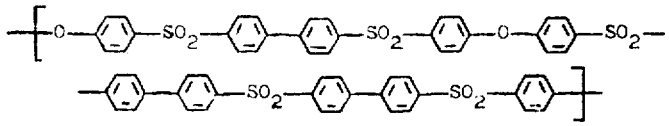

EXAMPLE 8

4-(4-Chlorophenylsulphonyl)thiophenol (11.38 g; 0.040 moles), anhydrous potassium fluoride (4.88 g; 0.084 moles) and degassed 1,1-dioxothiolan (16.3 g) were stirred together under a stream of dry nitrogen at 220°C for 4 hours. The resulting mixture was macerated with water, washed with boiling water (2 × 400 cm³) and methanol (2 × 300 cm³) and dried. The resulting polymer had repeat units

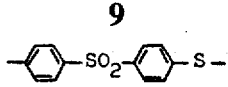

and a reduced viscosity of 0.38 as measured at 25°C on a 1% w/v solution of the polymer in N-methyl pyrrolidone.

EXAMPLE 9

4-(4-Chlorophenylsulphonyl)-4'-mercapto biphenyl (10.82 g; 0.030 moles), anhydrous potassium fluoride (3.66 g; 0.063 moles) and degassed 1,1-dioxothiolan (14.5 g) were stirred together under a stream of dry nitrogen at 200°C. After 80 minutes, more 1,1-dioxothiolan (12.3 g) was added and 10 minutes later the reaction mixture was cooled to 150°C and dimethyl formamide (50 cm³) was added. The reaction was continued for a further 5 hours and the resulting mixture was worked up as described in Example 8. The resulting polymer had repeat units

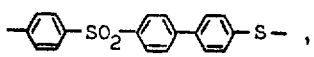

was crystalline with $T_m$ 330°C and was compression moulded at 350°C into thin, clear amber film.

I claim:

1. A process for the preparation of an aromatic polymer consisting essentially of recurring units of the formula $$-Ar-Q-$$

which comprises heating a reaction mixture consisting essentially of an alkali metal fluoride and (a) a halophenol having the formula $$X-Ar-QH$$

and/or (b) a substantially equimolar mixture of a dihalobenzenoid compound of the formula $$X-Ar-X$$

and a dihydric phenol of the formula $$HQ-Ar-QH$$

in which formulae Ar and Q are respectively a bivalent aromatic residue and an oxygen or sulphur atom and may vary from unit to unit in the polymer chain and X is a halogen atom, and each atom X is activated by a single electron attracting group selected from the group consisting of —CO— and —SO$_2$— in the associated aromatic residue Ar, the amount of alkali metal fluoride being such that the number of fluorine atoms present as alkali metal fluoride together with any of the atoms X in the halophenol X-Ar-QH and/or dihalobenzenoid compound X-Ar-X that are fluorine, in the reaction mixture is at least twice the number of —QH groups in the reaction mixture.

2. A process according to claim 1 in which Q is an oxygen atom.

3. A process according to claim 1 in which Q is a sulphur atom.

4. A process according to claim 1 in which an alkali metal fluoride is heated with an activated halophenol having the formula X-Ar-QH.

5. A process according to claim 1 in which an alkali metal fluoride is heated with a substantially equimolar mixture of an activated dihalobenzenoid compound of the formula —Ar-X and a dihydric phenol of the formula HQ-Ar-QH.

6. A process according to claim 1 in which the alkali metal fluoride is potassium fluoride.

7. A process for the preparation of an aromatic polymer consisting essentially of recurring units of the formula $$-Ar-Q-$$

which comprises (1) forming a reaction mixture consisting essentially of a first component consisting of (a) a halophenol having the formula $$X-Ar-QH$$

and/or (b) a substantially equimolar mixture of a dihalobenzenoid compound of the formula $$X-Ar-X$$

and a dihydric phenol of the formula $$HQ-Ar-QH$$

and a second component consisting of at least one of (c) and alkali metal fluoride, (d) a preformed fluorophenate having the formula $$F-Ar-QM$$

and (e) a substantially equimolar mixture of a difluorobenzenoid compound of the formula $$F-Ar-F$$

and a preformed bisphenate of the formula $$MQ-Ar-QM$$

in which formulae AR is a bivalent aromatic residue, Q is an oxygen or sulphur atom, X is a halogen atom, each of said X and F atoms being activated by a single electron attracting group selected from the group consisting of —CO— and —SO$_2$— in the associated aromatic residue Ar, and M is alkali metal, and said groups Ar and atoms Q may vary from unit to unit in the polymer chain, the amount of said second component being such that the number of fluorine atoms present as alkali metal fluoride, as F in the fluorophenate F-Ar-QM and/or difluorobenzenoid compound F-Ar-F, together with any of the atoms X in the first component that are fluorine, in the reaction mixture is from 2.0 to 2.1 times the number of —QH groups in the reaction mixture, (2) heating said reaction mixture and (3) extracting aromatic polymer from said reaction mixture.

8. A process for the preparation of an aromatic polymer consisting essentially of recurring units of the formula $$-Ar-Q-$$

which comprises (1) forming a reaction mixture consisting essentially of a first component consisting of (a) a halophenol having the formula $$X-Ar-QH$$

and/or (b) a substantially equimolar mixture of a dihalobenzenoid compound of the formula X-Ar-X and a dihydric phenol of the formula HQ-Ar-QH and a second component consisting of at least one of (c) an alkali metal fluoride, (d) a preformed fluorophenate having the formula F-Ar-QM and (e) a substantially equimolar mixture of a difluorobenzenoid compound of the formula F-Ar-F and a preformed bisphenate of the formula MQ-Ar-QM in which formulae Ar is a bivalent aromatic residue, Q is an oxygen or sulphur atom, X is a halogen atom, each of said X and F atoms being activated by a single electron attracting group selected from the group consisting of —CO— and —SO$_2$— in the associated aromatic residue Ar, and M is alkali metal, and said groups Ar and atoms Q may vary from unit to unit in the polymer chain, the amount of said second component being such that the number of fluorine atoms present as alkali metal fluoride, as F in the fluorophenate F-Ar-QM and/or difluorobenzenoid compound F-Ar-F, together with any of the atoms X in the first component that are fluorine, in the reaction mixture is at least twice the number of —QH groups in the reaction mixture, and the amount of said components (d) and (e) being up to that wherein the number of fluorine atoms present as F in the fluorophenate F-Ar-QM and/or difluorobenzenoid compound F-Ar-F, together with any of the X atoms in the first component that are fluorine, equals twice the number of QH groups in the reaction mixture, (2) heating said reaction mixture and (3) extracting aromatic polymer from said reaction mixture.

9. A process according to claim 7 in which Q is an oxygen atom.

10. A process according to claim 8 in which Q is an oxygen atom.

11. A process according to claim 7 in which Q is a sulphur atom.

12. A process according to claim 8 in which Q is a sulphur atom.

13. A process according to claim 7 in which the alkali metal is potassium.

14. A process according to claim 8 in which the alkali metal is potassium.

* * * * *